(12) United States Patent
Li et al.

(10) Patent No.: US 8,744,707 B2
(45) Date of Patent: Jun. 3, 2014

(54) CVT CONTROL USING STATE SPACE BASED GAIN SCHEDULING

(75) Inventors: Wei Li, Peoria, IL (US); Brian D. Hoff, East Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 665 days.

(21) Appl. No.: 13/077,694

(22) Filed: Mar. 31, 2011

(65) Prior Publication Data

US 2012/0253631 A1 Oct. 4, 2012

(51) Int. Cl.
  *G06F 7/00* (2006.01)
  *G06F 17/00* (2006.01)
  *G06F 19/00* (2011.01)

(52) U.S. Cl.
  USPC .............. 701/56; 701/53; 701/54; 701/55; 701/58; 701/60

(58) Field of Classification Search
  None
  See application file for complete search history.

(56) References Cited

U.S. PATENT DOCUMENTS

| | | | |
|---|---|---|---|
| 3,952,515 A * | 4/1976 | Habiger et al. ................. | 60/447 |
| 4,195,337 A | 3/1980 | Bertrand et al. | |
| 4,459,878 A * | 7/1984 | Frank ............................... | 477/39 |
| 4,612,827 A * | 9/1986 | Omitsu ............................ | 477/43 |
| 4,738,160 A | 4/1988 | Sada | |
| 5,268,626 A | 12/1993 | Gaudillat | |
| 5,669,849 A | 9/1997 | Tabata et al. | |
| 5,784,883 A * | 7/1998 | Ohkura et al. .................. | 60/327 |
| 5,847,895 A | 12/1998 | Romano et al. | |
| 6,133,643 A | 10/2000 | Lukich et al. | |
| 6,202,629 B1 | 3/2001 | Zhu et al. | |
| 6,424,902 B1 * | 7/2002 | Kuras .............................. | 701/51 |
| 6,622,080 B2 | 9/2003 | Yang et al. | |
| 7,222,112 B2 | 5/2007 | Jacobson | |
| 7,357,745 B2 | 4/2008 | Hidaka et al. | |
| 7,534,185 B2 * | 5/2009 | Goma Ayats ................. | 475/209 |
| 7,789,795 B2 * | 9/2010 | McKenzie et al. .............. | 477/41 |
| 2007/0112443 A1 | 5/2007 | Latham et al. | |
| 2009/0005914 A1 * | 1/2009 | Demarco et al. .............. | 700/282 |
| 2009/0192634 A1 | 7/2009 | Fujinaka | |
| 2011/0295473 A1 * | 12/2011 | DeMarco et al. ............... | 701/58 |

FOREIGN PATENT DOCUMENTS

| WO | 97/05604 A1 | 2/1997 | |
|---|---|---|---|
| WO | WO 2009/115844 | * | 9/2009 |

* cited by examiner

*Primary Examiner* — Khoi Tran
*Assistant Examiner* — Bao Long T Nguyen
(74) *Attorney, Agent, or Firm* — Leydig, Voit & Mayer

(57) ABSTRACT

An engine powered wheeled machine having improved engine over speed and under speed protection includes a parallel path transmission having a gear train with first and second transmission inputs and a transmission output, and including a hydraulic variator having a variator output driving the first transmission input, the hydraulic variator having a variator pump and a variator motor, the displacement of the variator pump being controlled by a variator actuator. The machine further includes an engine having an engine output driving the second transmission input and driving the variator pump and a controller for receiving one or more values indicative of one or more ranges of permissible engine speed, a value indicative of an actual engine speed, and a value indicative of the position of the variator actuator, with the controller being configured to control the position of the variator actuator based on state space gain mapping to maintain the engine speed within the one or more ranges of permissible engine speed.

20 Claims, 5 Drawing Sheets

CVT CONTROL USING STATE SPACE BASED GAIN SCHEDULING

TECHNICAL FIELD

This patent disclosure relates generally to industrial machine control, and more particularly to a proportional continuously variable transmission (CVT) control using state space based gain scheduling.

BACKGROUND

Machine efficiency is an increasingly important consideration for large industrial, construction, and off-highway machines. This is due in part to ever-increasing fuel prices, but is also caused to some extent by increasingly stringent pollution limitations. One technology used to improve machine efficiency while also providing an improved operator experience is the CVT or Continuously Variable Transmission. While there are many types of CVTs, the type most often found on larger machines is the parallel path variator transmission or hydrostatic parallel path transmission.

This type of transmission employs a gear train that receives an input from the engine as well as from a hydraulic motor with continuously variable output. By smoothly varying the hydraulic motor speed, the final output of the gear train may be continuously varied over a wide range of speeds and/or torque values. As useful as this system is, there are still certain drawbacks that remain to be addressed.

Of interest here, CVT transmissions of the type described above have many sources of nonlinearity, and can thus be difficult to control accurately. Moreover, the failure to control the transmission with sufficient accuracy may result not only in an unpleasant operator experience, but may also result in damage to the machine. For example, a CVT used in an off-highway machine application can experience mechanical damage if the engine and/or power train exceeds predetermined over-speed limits during vehicle deceleration. This situation can arise when an operator decelerates the machine using the engine and transmission rather than by using the service brakes. On the other end of the speed range, underspeed problems can occur in a wheel loader application, for example, when the bucket enters a material pile suddenly, causing the engine to lug down.

As noted above, the nonlinearity and complexity of CVT control systems can render overshoot and undershoot control difficult. In some cases, the over speed control logic must change substantially during directional shifts, e.g., the system dynamics change significantly between 2 to 2, 3 to 3, and high speed directional shifts. In order to deal with the nonlinearities of such a system error based gain scheduling techniques have been applied to the standard PID control. However, it is remains challenging in reality to meet all performance requirements with an error based gain scheduling PID controller due to the complexity of the non-linear system dynamics. Thus, in the inventors' observation, a new system of CVT control is needed for replacement of the standard error based gain scheduling PID control in off-highway applications.

SUMMARY

In one aspect, the description illustrates and explains an engine powered wheeled machine having improved engine over speed and under speed protection. The machine includes a parallel path transmission having first and second transmission inputs and a transmission output, as well as a hydraulic variator having a variator output driving the first transmission input, the hydraulic variator having a variator pump and a variator motor, the displacement of the variator pump being controlled by a variator actuator. The machine further includes an engine having an engine output driving the second transmission input and driving the variator pump and a controller for receiving one or more values indicative of one or more ranges of permissible engine speed, a value indicative of an actual engine speed, and a value indicative of the position of the variator actuator, with the controller being configured to control the position of the variator actuator based on state space gain mapping to maintain the engine speed within the one or more ranges of permissible engine speed.

In another aspect, the disclosure describes a method of controlling an engine powered wheeled machine to avoid engine over speed and engine under speed, the engine powered wheeled machine including a parallel path transmission powered by the engine and by a hydraulic variator driven by the engine, the displacement of the variator being controlled by a variator actuator. The method includes receiving one or more values indicative of one or more ranges of permissible engine speed, receiving a value indicative of an actual engine speed, and receiving a value indicative of the position of the variator actuator. The method further includes controlling the position of the variator actuator based on state space gain mapping to maintain the engine speed within the one or more ranges of permissible engine speed.

In yet another aspect, the disclosure includes a non-transient computer-readable medium having stored thereon computer-executable instructions for executing a method of controlling an engine powered wheeled machine to avoid engine over speed and engine under speed. The engine powered wheeled machine includes a parallel path transmission powered by the engine. The parallel path transmission includes a hydraulic variator, with the displacement of the variator being controlled by a variator actuator. The computer-executable instructions include instructions for receiving one or more values indicative of one or more ranges of permissible engine speed, a value indicative of an actual engine speed, and a value indicative of the position of the variator actuator, as well as instructions for controlling the position of the variator actuator. A PI controller with state space based gain scheduling is used to control the desired transmission output torque. The transmission sub-system controls move the actuator to the corresponding position to generate the desired output torque.

Further and alternative aspects and features of the disclosed principles will be appreciated from the following detailed description and the accompanying drawings, of which:

DETAILED DESCRIPTION

This disclosure relates to a system for executing a proportional control structure to solve overshoot and undershoot issues for complex non-linear systems by incorporating a 2 or 3 dimensional gain lookup tables. The state space table represents the trajectory of the system state. In an embodiment, a 2 axis table includes an error (e) term and the first derivative (e') of the error term. In an embodiment, a 3 axis table includes an error (e) term, the first derivative (e') of the error term, and the second derivative (e") of the error term. The described method schedules the individual P, I, or D controller gain based on the state space table lookup.

By way of example, consider a P gain schedule using a 2-dimensional state space (phase plane) table lookup for over speed control of a CVT of the type described above. There is a significant delay between the retarding torque command to the transmission and the actual generation of retarding torque. Conventional error based gain scheduling has difficulty accounting for the delay and can result in overshoot. However, using state space gain scheduling as described herein, the system is able to slow down the control when the speed is approaching the target based on the tendency of the speed error change (first order derivative).

Figure 1:
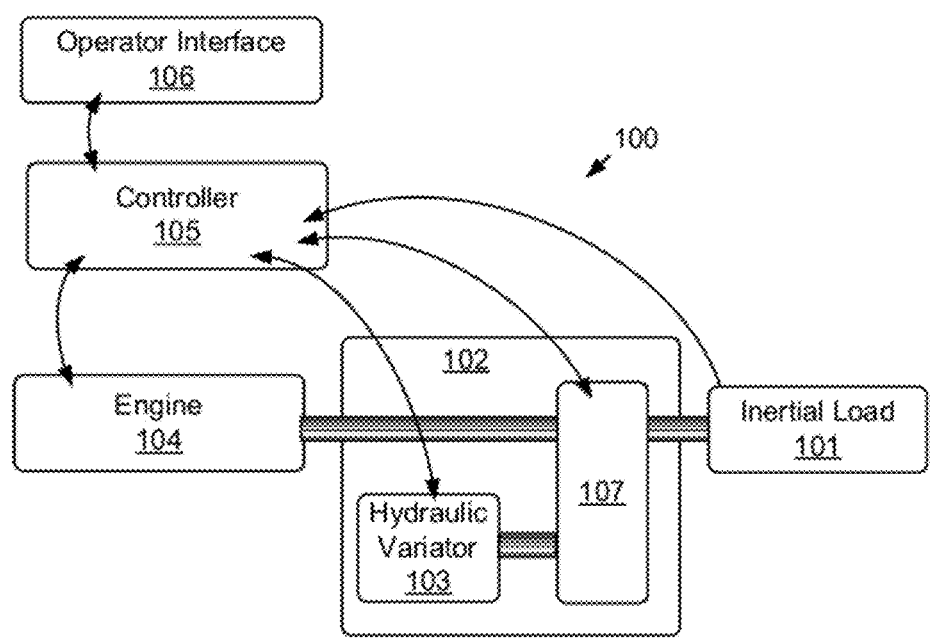
FIG. 1 is a is simplified system diagram showing an example system configuration usable in accordance with the disclosed principles.

Turning now to a more detailed description of the system, FIG. 1 is a simplified system diagram showing the control paths and major mechanical systems usable within various embodiments of the described principles to effectuate engine speed control in an off-highway machine. The machine system 100 includes an inertial load 101, which may be the moving mass, both linear and rotational, of the machine itself prior to deceleration. The inertial load is linked to the parallel path transmission 102 to exchange rotational energy therewith, the parallel path transmission 102 being linked to and the engine 104 to exchange rotational energy with the engine 104.

The parallel path transmission 102 comprises a gear system 107, which is typically a planetary gear system having two inputs and a single output. The first input is from the engine 104 and the second input is from a hydraulic variator 103. The hydraulic variator 103 is itself powered by engine as well. At any given engine speed, the output of the hydraulic variator can be varied to continuously vary the output speed and the torque of the gear system 107.

A controller 105 receives data from the system components and sends commands to various components to implement the speed and torque control method described herein. For some applications, e.g., wheel loader applications, the transmission torque is a more important variable than the speed. The controller 105 receives ground speed data from the inertial load 101 and receives transmission speed data from the parallel path transmission 102. In addition, the controller 105 receives data from and sends commands to both the engine 104 and the hydraulic variator 103.

In operation, the controller 105 controls the engine and hydraulic variator 103 to set the machine speed and torque in accordance with operator controls received from the operator interface 106, within predetermined limitations and criteria. For example, pollution limits, engine wear limits, variator damage limits, and so on may impose restrictions on the extent to which and/or speed with which the machine can be made to respond to the operator interface 106.

Thus, for example, while the operator may manipulate the controls to provide full engine breaking from a high travel speed, the controller 105 may intercede and limit the engine speed to prevent a damaging over speed condition. Similarly, if the operator manipulates the controls in a way that would cause unacceptable engine lugging, the controller 105 is able to adjust the operation of the engine and hydraulic variator 103 to prevent such lugging.

The introduction of machine acceleration in the gain scheduling table provides a better description of the machine state relative to the desired state, e.g., the origin or (0, 0, . . . 0) point within the state space. This improves the gain scheduling accuracy based on the machine state. When the speed error is small and acceleration is neglected, a small gain would be applied using an error-based gain scheduling approach. However, this can lead to erroneous results. For example, in a situation wherein the speed error is small but the acceleration is large, there will be a tendency to overshoot the target state. Likewise, when the speed error is small and the acceleration is a small negative number, there will be a tendency to undershoot the target or, in extreme cases, to lug down.

Figure 2:
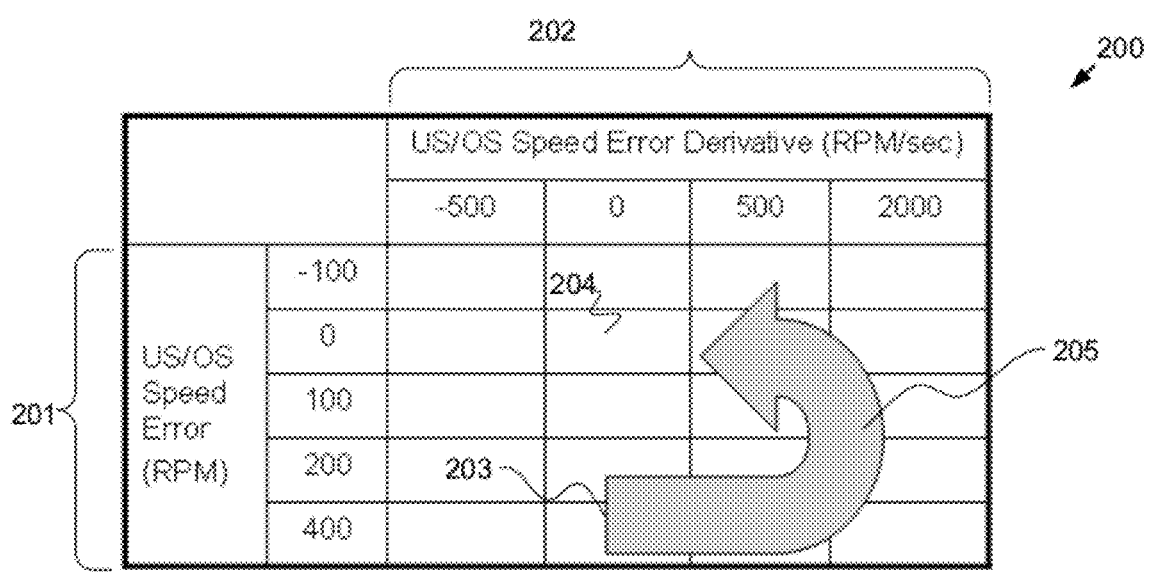
FIG. 2 illustrates a speed error/speed error derivative chart showing a plurality of potential speed error values and a plurality of potential speed error derivative values in accordance with the disclosed principles.

As noted above, the disclosed system instead schedules gain based on machine state variable trajectories in state space to provide greater stability towards a desired state. A situation corresponding to speed error and acceleration error based gain scheduling is shown in chart form in FIG. 2. In particular, FIG. 2 illustrates a speed/acceleration error chart 200 showing a plurality of potential speed error values 201 and a plurality of potential acceleration error values 202. In particular, the potential acceleration error values 202 representing the derivatives of the speed error curve traversed at any given moment by the system. In the illustrated scenario, the initial state 203 of the system corresponds to a speed error of approximately −320 and an acceleration error of approximately zero, i.e., the speed error is not actively changing in the initial machine state 203. For purposes of this illustration, the precise mechanical system and units of measurement are not important, although for purposes of illustration the speed/acceleration error chart 200 lists the potential speed error values 201 in units of RPM and the potential acceleration error values 202 in units of RPM/sec.

As can be seen, the system trajectory 205 passes along a path before settling at the origin 204 whereat the (speed error, acceleration error) pair is equal to (0, 0). The trajectory from the initial state 203 to the origin is an arc in the error state space, with no overshoot in the dimension of speed, i.e., with no reversal of direction.

There is closed-loop speed control for the inner loop of the control system implemented by the controller 105, as described above, and so the system avoids the use of a complicated outer loop structure. In particular, the closed-loop position control for the inner loop is sufficient even when there are other nonlinearities in addition to speed sensor error or delay, e.g., slippage. While the D term in a PID controller is intended to provide prediction operation, it requires significant design accommodations and balancing between P and D, with the ever-present risk of controller instability. In contrast, the disclosed system allows a simple proportional (P) control structure which inherently provides prediction.

Figure 3:
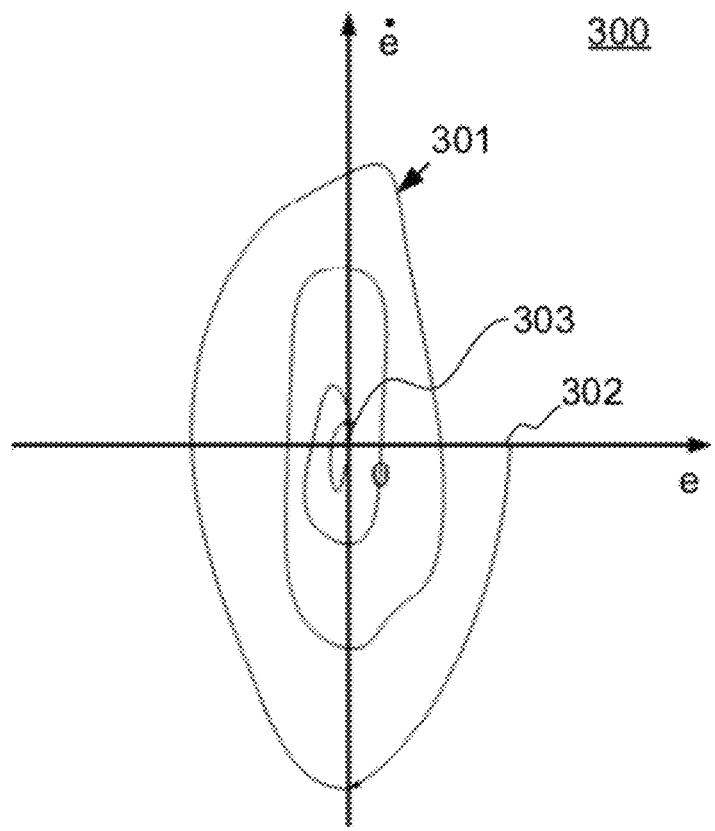
FIG. 3 is a speed error derivative/error phase plane chart, which is the two dimensional case of the state space diagram, showing a state space trajectory from an initial machine state to the equilibrium state space origin during ordinary PID operation.

The described system also significantly outperforms PID control structures with respect to complexity of gain tuning. As discussed above, in the present system, the tuning of the gain map is directly correlated to the trajectory of the machine state in the state space. The trend of the map follows from the trace of the machine motion. FIG. 3 is an acceleration error/velocity error state space diagram 300 showing a state space trajectory 301 from an initial machine state 302 to the state space origin 303 (0,0) during ordinary PID operation. As can be seen, the acceleration error and velocity error swing both positive and negative during the traversal from the initial machine state 302 to the state space origin 303.

Figure 4:
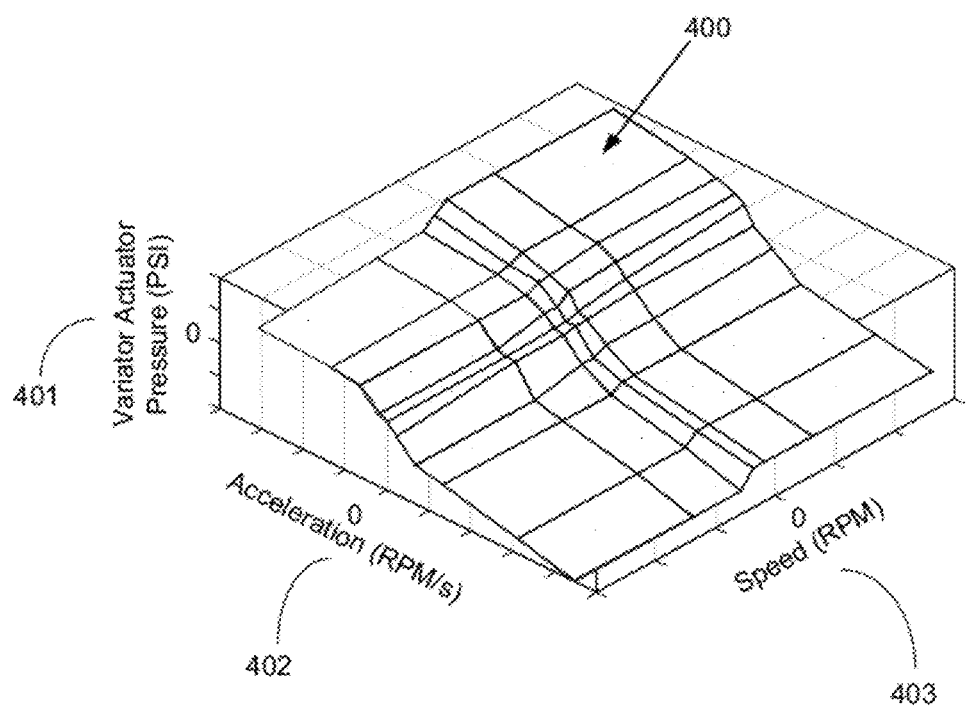
FIG. 4 is a gain map scheduled based on the trajectory of the machine state in state space in accordance with the described principles.

As noted above, the described system reduces the complexity of gain tuning, since the gain map is correlated to the trajectory of the machine state in the state space. Such a gain map 400 can be seen in FIG. 4. The three dimensions of the illustrated state space are (a) variator actuator pressure (psi) 401, (b) engine acceleration (RPM/s) 402, and (c) engine speed (RPM) 403. The variator actuator pressure in the illustrated example represents a pressure to apply to the variator actuator to yield a displacement providing the desired acceleration and speed error.

Thus, as a general example to understand the operation of the gain scheduling based on the map 400, if acceleration is negative and speed is less than the desired speed (and thus the speed error is negative), then the scheduled gain is such as to decrease the actuator pressure, destroking the variator and preventing lugging. In contrast, if the speed error is positive and the acceleration is positive, then the scheduled gain from the map 400 is such as to increase the actuator pressure, increasing the variator displacement and providing greater resistance against over-speeding of the engine.

It will be appreciated that the aforementioned mapping and control are executed by the processor or computer execution of computer-executable instructions stored on a non-transient computer-readable medium, such as RAM, ROM, flash drive, optical drive, EPROM, etc. Thus, for example, the process may be executed by a dedicated controller such as controller 105, by an ECU, by a TCU, etc., and may be performed by a single processor or by multiple processors, together or in different units. For clarity, the executing entity has been referred to as the controller 105.

Figure 5:
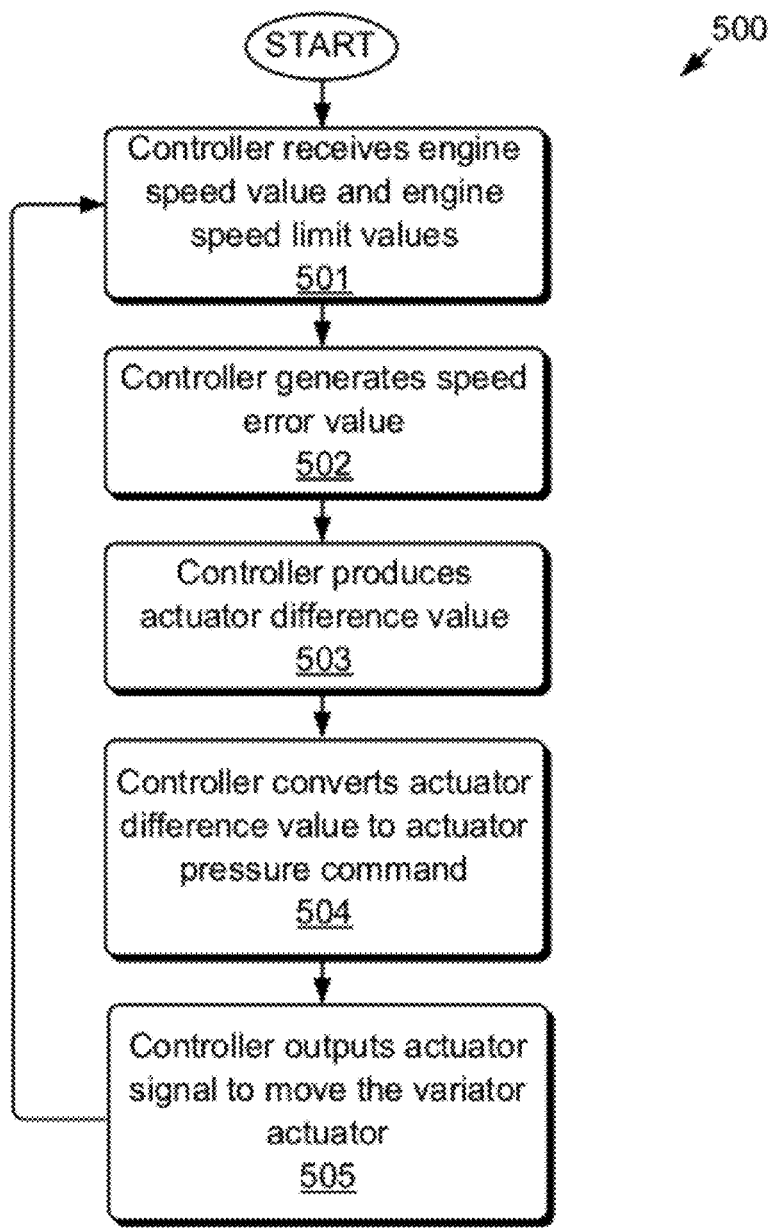
FIG. 5 is a flow chart illustrating a process of state space based variator PI control in accordance with the described principles.

Although those of skill in the art will appreciate that there are numerous ways in which to implement the described principles, the CVT control process 500 shown in the flow chart of FIG. 5 illustrates one exemplary implementation. At stage 501 of the CVT control process 500, the controller 105 receives a value representing an engine speed (e.g., speed of the engine 104) as well as a value representing one or more engine speed limits, e.g., an over-speed limit and/or an under-speed limit. The speed limits may be input contemporaneously, e.g., by a programmer or operator, or may be received from a computer-readable memory.

At stage 502, and based on the received values, the controller generates a speed error value indicating whether the engine speed has violated one of the received speed limits. If the engine speed has not violated one of the received speed limits, then the CVT control process 500 returns to stage 501 to receive updated speed values. However, if the speed error value indicates that the engine speed has violated one of the received speed limits, then the controller produces an actuator difference value at stage 503 representing the amount by which the actuator pressure should be modified so that the engine stays within the speed limits. At stage 504, the actuator difference value is converted to an actuator pressure command.

Subsequently at stage 505, the controller produces an actuator signal to move the variator actuator to reduce the extent of over speed or under speed, e.g., so that the engine speed tends toward a position within the limits. Once the actuator signal is sent, the CVT control process 500 returns to stage 501 to await updated speed values and make further corrections to the bowl position as needed.

INDUSTRIAL APPLICABILITY

The described system and principles are applicable to machines wherein engine over speed and lugging are controllable by controlling a variator in parallel with the engine. By way of example, wheel loaders having a hydraulic parallel path variator transmission may experience control difficulty while rapidly changing from reverse motion to forward motion. Such a change in direction may occur when the operator backs the wheel loader away from a material pile, slows the wheel loader to a stop, shifts from reverse to forward gear, and moves the wheel loader forward to deposit the load carried in the bucket. In this example, the operator may use the engine to assist in slowing the wheel loader after backing away from the pile in order to increase the life of the service brakes.

When the machine decelerates, it drives the engine through the lower power train and transmission. The kinetic energy of the moving machine is consumed by the engine through two primary energy loss mechanisms: friction as well as energy absorption by pumping air during forced turnover. One additional power consumption mechanism is engine acceleration, i.e., due to the torque required to accelerate the rotating mass. The power (Hp or kW) required to accelerate the rotating mass is proportional to the angular acceleration because power is equal to torque multiplied by annular velocity (crankshaft speed) divided by a constant.

One goal of the control system described herein is to permit rapid engine acceleration and corresponding energy consumption without permitting engine speed overshoot, which may result in engine or transmission component damage. In this example, the wheel loader transmission uses a hydraulic variator to control the vehicle's ability to accelerate the engine during periods of vehicle retarding. During this process, large gains will reduce response time, but will also increase the tendency for engine speed to overshoot. Thus, the described system modifies the gain term based on the error term, which improves response time while limiting overshoot. As noted above, the gain term may be modified by either a 2D or 3D gain lookup table, where the 3D table includes the error (e) term, the first derivative of the (e') error term, and the second derivative of the (e") error term.

Although the description focuses primarily on a wheel loader machine having a CVT, it will be appreciated that there are many machines, whether in industry, construction, mining, or otherwise, that can benefit from application of the described implementations and principles. For example, locomotive applications may benefit from more precise control during braking, to avoid ineffective braking on the one hand and wheel lock on the other hand. Other examples will be readily apparent to those of skill in the art.

It will be appreciated that the foregoing description provides useful examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for the features of interest, but not to exclude such from the scope of the disclosure entirely unless otherwise specifically indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. For example, the illustrated calibration steps may optionally be executed in reverse order, and other alternative orders and steps may be practicable where logically appropriate without departing from the described principles.

We claim:

1. An engine powered wheeled machine having improved engine over speed and under speed protection, the machine comprising:
    a parallel path transmission having a gear train with first and second transmission inputs and a transmission output, and including a hydraulic variator having a variator output driving the first transmission input, the hydraulic variator having a variator pump and a variator motor, the displacement of the variator pump being controlled by a variator actuator;
    an engine having an engine output driving the second transmission input and driving the variator pump; and
    a controller for receiving one or more values indicative of one or more ranges of permissible engine speed, a value indicative of an actual engine speed, and a value indicative of the position of the variator actuator, the controller being configured to control the position of the variator actuator based on state space gain mapping to maintain the engine speed within the one or more ranges of permissible engine speed.

2. The engine powered wheeled machine according to claim 1, wherein the controller further comprises a non-transient computer-readable medium having thereon computer executable instructions for execution by the controller, the instructions comprising instructions for generating an engine speed error value.

3. The engine powered wheeled machine according to claim 2, wherein the computer-executable instructions further comprise instructions for producing an actuator difference value when the engine speed error value indicates an engine speed outside of the one or more ranges of permissible engine speed, wherein the actuator difference value represents an amount by which the actuator position deviates from a position that would return the engine speed to within the one or more ranges of permissible engine speed.

4. The engine powered wheeled machine according to claim 3, wherein the computer-executable instructions further comprise instructions for converting the actuator difference value to an actuator pressure command via the state space based mapping.

5. The engine powered wheeled machine according to claim 4, wherein the computer-executable instructions further comprise instructions for outputting the actuator pressure command to control the variator actuator.

6. The engine powered wheeled machine according to claim 1, wherein the engine powered wheeled machine is a wheel loader.

7. The engine powered wheeled machine according to claim 1, wherein the one or more values indicative of one or more ranges of permissible engine speed include a first speed value indicating an upper limit above which the engine is over speeding.

8. The engine powered wheeled machine according to claim 7, wherein the one or more values indicative of one or more ranges of permissible engine speed include a second speed value indicating a lower limit below which the engine is lugging.

9. A method of controlling an engine powered wheeled machine to avoid engine over speed and engine under speed, the engine powered wheeled machine including a parallel path transmission powered by the engine and having a hydraulic variator driven by the engine, the displacement of the variator being controlled by a variator actuator, the method comprising:
    receiving one or more values indicative of one or more ranges of permissible engine speed;
    receiving a value indicative of an actual engine speed;
    receiving a value indicative of the position of the variator actuator; and
    controlling the position of the variator actuator based on state space gain mapping to maintain the engine speed within the one or more ranges of permissible engine speed.

10. The method of controlling an engine powered wheeled machine according to claim 9, wherein controlling the position of the variator actuator based on state space gain mapping includes generating an engine speed error value.

11. The method of controlling an engine powered wheeled machine according to claim 10, wherein controlling the position of the variator actuator based on state space gain mapping includes producing an actuator difference value when the engine speed error value indicates an engine speed outside of the one or more ranges of permissible engine speed, wherein the actuator difference value represents an amount by which the actuator position deviates from a position that would return the engine speed to within the one or more ranges of permissible engine speed.

12. The method of controlling an engine powered wheeled machine according to claim 11, wherein controlling the position of the variator actuator based on state space gain mapping includes converting the actuator difference value to an actuator pressure command via the state space based mapping.

13. The method of controlling an engine powered wheeled machine according to claim 12, wherein controlling the position of the variator actuator based on state space gain mapping includes outputting the actuator pressure command to control the variator actuator.

14. The method of controlling an engine powered wheeled machine according to claim 9, wherein the engine powered wheeled machine is a wheel loader.

15. The method of controlling an engine powered wheeled machine according to claim 9, wherein the one or more values indicative of one or more ranges of permissible engine speed include a first speed value indicating an upper limit above which the engine is over speeding.

16. The method of controlling an engine powered wheeled machine according to claim 15, wherein the one or more values indicative of one or more ranges of permissible engine speed include a second speed value indicating a lower limit below which the engine is lugging.

17. A non-transient computer-readable medium having stored thereon computer-executable instructions for executing a method of controlling an engine powered wheeled machine to avoid engine over speed and engine under speed, the engine powered wheeled machine including a parallel path transmission powered by the engine and having a hydraulic variator driven by the engine, the displacement of the variator being controlled by a variator actuator, the computer-executable instructions comprising:
    instructions for receiving one or more values indicative of one or more ranges of permissible engine speed;

instructions for receiving a value indicative of an actual engine speed;

instructions for receiving a value indicative of the position of the variator actuator; and instructions for controlling the position of the variator actuator based on state space gain mapping to maintain the engine speed within the one or more ranges of permissible engine speed.

18. The non-transient computer-readable medium according to claim 17, wherein the state space is of at least two dimensions including an engine speed error dimension and an engine speed error derivative dimension, and wherein the instructions for controlling the position of the variator actuator based on state space gain mapping include instructions for generating an engine speed error value and a derivative of the engine speed error value.

19. The non-transient computer-readable medium according to claim 17, wherein the one or more values indicative of one or more ranges of permissible engine speed include a first speed value indicating an upper limit above which the engine is over speeding.

20. The non-transient computer-readable medium according to claim 17, wherein the one or more values indicative of one or more ranges of permissible engine speed include a second speed value indicating a lower limit below which the engine is lugging.

* * * * *